United States Patent [19]

Hogg et al.

[11] 3,772,604

[45] Nov. 13, 1973

[54] NON-RECTIFYING CLAMPS

[75] Inventors: Walter R. Hogg, Miami Lakes; Wallace H. Coulter, Miami Springs, both of Fla.

[73] Assignee: Coulter Electronics, Inc., Hialeah, Fla.

[22] Filed: May 12, 1972

[21] Appl. No.: 252,794

[52] U.S. Cl. .................. 328/169, 307/230, 307/235, 307/237, 328/162, 330/110

[51] Int. Cl. .......................... H03k 5/08, H03b 3/02

[58] Field of Search .................... 307/235, 230, 237; 328/169, 175, 54, 162; 330/11, 110

[56] References Cited

UNITED STATES PATENTS

| | | | |
|---|---|---|---|
| 3,435,252 | 3/1969 | Eubanks | 307/237 |
| 3,579,123 | 5/1971 | Koga | 328/162 X |

*Primary Examiner*—John Zazworsky
*Attorney*—I. Irving Silverman et al.

[57] ABSTRACT

To clamp a train of electric pulses in a system having a small signal-to-noise ratio, the point in the circuit to be clamped is arranged such that the d.c. level appears at the output thereof, is filtered therefrom and fed back to the input of the clamped stage, where it is subtracted out. The feedback path is broken if the output exceeds a predetermined value.

Thus, the feedback path is interrupted during signal pulses. However, in the absence of pulse signals, the feedback arrangement maintains the base line close to ground.

20 Claims, 14 Drawing Figures

NON-RECTIFYING CLAMPS

BACKGROUND OF THE INVENTION

This invention relates to electric clamping apparatus and methods, and may be applied, for example, to clamping of trains of pulses produced by particles passing through an electric sensing zone in apparatus for analysis of fluid suspended particles.

The basic principle of such analysis is referred to as the Coulter principle and is described in U.S. Pat. No. 2,656,508. According to this principle, the passage of microscopic particles suspended in a conducting liquid through an aperture, having dimensions which approximate those of the particle, causes a change in the impedance of the electrical path through the liquid effectively contained in the aperture, if the material of the particle and the liquid have different conductivities. Studies have shown that the magnitude of this change is proportional to the volume of the particle where the cross-sectional area of the particle is much smaller than the cross-sectional area of the aperture and the particle is small enough to be completely contained in the sensing zone thus formed.

Under proper conditions electric signals are generated, the respective amplitudes of which, generally are linear functions of the volumes of the respective particles passing through the aperture. Such signals may be considered as comprising a d.c. level and pulses superimposed thereupon. The d.c. component of the pulses themselves is made immaterial by this invention as will be explained hereinafter.

Since, as a rule, the d.c. level is not reliable, it is, in order to analyze the pulses, desirable to eliminate or stabilize same.

The elimination or stabilization of the d.c. level, frequently called the baseline of the pulses is a special example of a more general process known as clamping. Clamping is most commonly used in apparatus for processing pulse train types of signals and has been defined, generally, as a method of processing pulses such as to ensure that the baseline, i.e. the "signal" level between pulses has a desired d.c. level. Thus, the baseline of such a pulse type signal may be clamped to zero or to a certain voltage level.

The simplest form of a clamping circuit which has been used extensively in the prior art comprises a diode associated with a resistance-capacitance network, as will next be explained.

Normally, in order to clamp a pulse train so as to force the base line to be at ground or at any desirable d.c. level, a diode is placed on the output side of a coupling capacitor, and a resistor parallel to the diode. If positive pulses are used, the anode of this diode is grounded and the cathode is connected to the signal path. When a pulse arrives, it drives the cathode positive, and no current flows in the diode. During the pulse, a small amount of the charge on the coupling capacitor leaks off through the resistor. When the pulse subsides, and the input side of the capacitor goes back to the base line, the output side is about to go negative. As soon as it does, the diode conducts, and charging current flows in it and the capacitor. This action restores the original charge on the capacitor which it had before the pulse, and the low impedances of the diode when it conducts and of the driving amplifier short out the negative-going voltage. Thus, the voltage at the output side of the capacitor sits with a gounded base line and puts out only positive pulses as desired. In addition, means may be incorporated to balance out the forward voltage drop in the diode, or it may be included in a feedback path to avoid its effect.

This conventional method is adequate where the pulses are of a nature such that there is a large signal-to-noise ratio, but when the noise is not small compared to the pulses, the clamp circuit acts like a half wave rectifier, and rectifies the noise so that the quiescent level, which may be called the base line, sits at a positive voltage somewhat less than the peak value of the noise. If, for example, the rectified noise voltage is 1 millivolt, and a one millivolt pulse comes along, the combination would trigger a threshold level at 2 millivolts. On the other hand, if a 2 millivolt pulse came along, the sum would trigger a 3 millivolt threshold level circuit. Thus, two pulses 2:1 by amplitude have actuated threshold circuits whose levels are in the ratio of 3:2. If the volts were always a constant amplitude, such as 1 millivolt, the base line could be offset in the opposite direction by that 1 millivolt and the rectifier noise level would be cancelled, but the noise usually varies with many other things.

As is evident from the preceding remarks, the coupling capacitor is a device which, in conjunction with the d.c. resistance of the circuit which follows it, passes or tranmits to the following stage all of the pulse information, but blocks the d.c. level and, to a satisfactory extent, inhibits slow changes in the d.c. level from being applied to the following stage, so that it may operate properly.

On the other hand, since the old d.c. level has been eliminated, a new d.c. level has to be established for the following stage, which is one of the objects of the invention, as explained hereinafter.

SUMMARY OF THE INVENTION

Accordingly, it is an object of the invention to provide a system which does not respond to the d.c. level of the signal, but only to the pulses thereof.

Another object of the invention is to provide a system which is capable of stabilizing at its own baseline or operating point which is unrelated to the operating point of the preceding stage.

A further object of the invention is to provide a system which is capable of being forced to have the new operating point at some desired level.

Another object of the invention is to provide clamping apparatus for a system including electric pulses and noise, wherein the noise level is not small relative to the pulse level, the apparatus comprising an amplifier having a feedback path which is constructed such as to conduct the d.c. level and the noise filtered from the amplifier output to an amplifier input via a linear, non-rectifying, path for subtraction, thereby maintaining the base line of the noise close to ground or other desired level, the apparatus further comprising threshold and switch elements for interrupting the feedback path during signal pulse, such that upon the signal pulse subsiding the amplifier settles again at the center of the noise. With sufficiently high gain amplifiers, the two stages may be made to act exactly as if they were two simple amplifiers with a coupling capacitor between them. There is an important difference, however, in that there is now a path, the feedback path, with the d.c. level and only the d.c. level thereupon.

A further object is to provide clamping apparatus without using an amplifier between the input and output terminals thereof.

Other objects and advantages not specifically enumerated will become apparent to those skilled in this art as a description of the preferred embodiments is set forth in detail. BRIEF DESCRIPTION OF THE DRAWINGS FIG. 1 illustrates a conventional clamping circuit;

DESCRIPTION OF THE PREFERRED EMBODIMENTS

Figures 1, 2, 3, 4, 5:
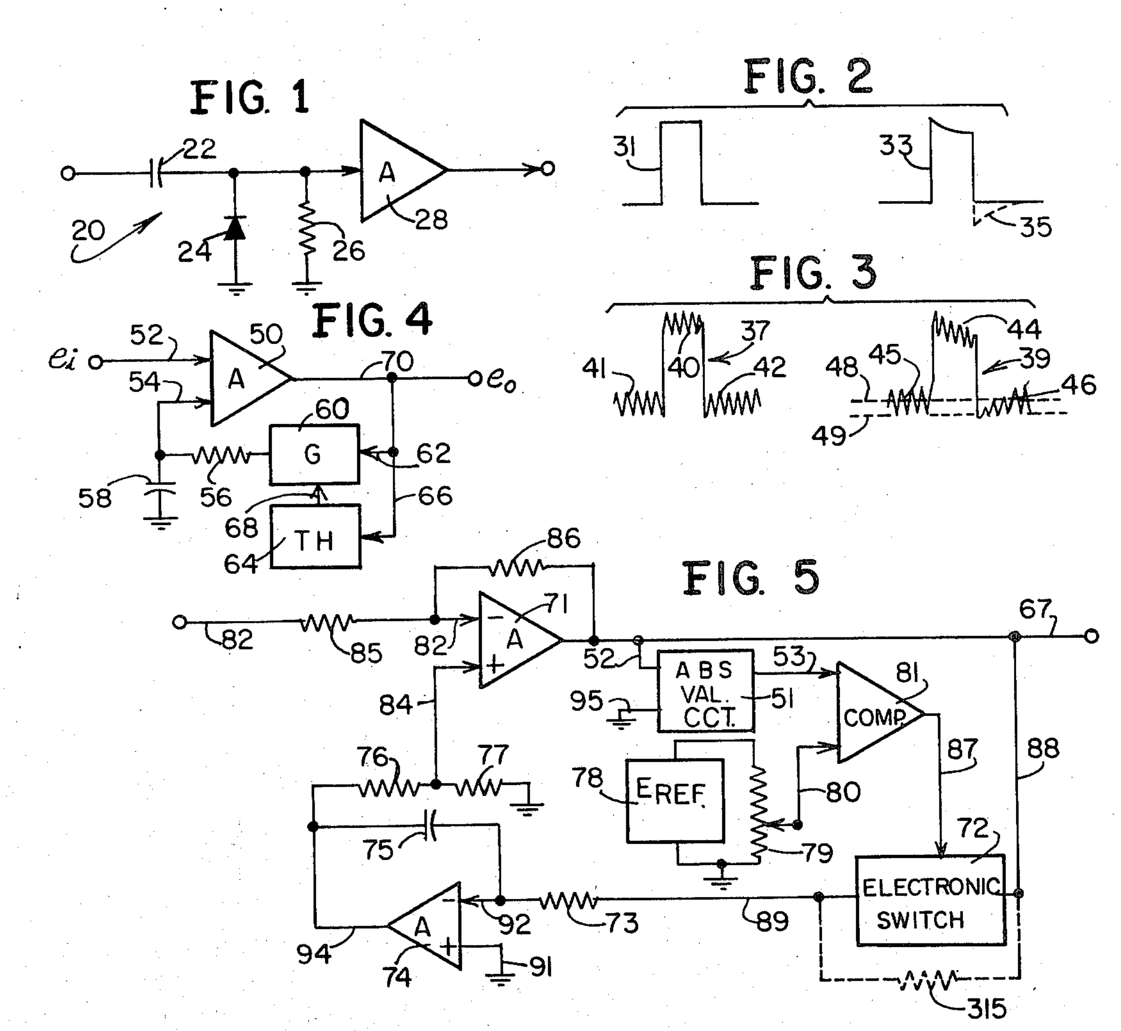
FIG. 2 illustrates a pulse on the input side of the capacitor of FIG. 1 and a pulse emerging therefrom.
FIG. 3 illustrates wave forms including noise which is not small compared to the signal.
FIG. 4 shows in block form the basic concept of the invention.
FIG. 5 illustrates in block form an embodiment of the invention in accordance with the basic concept shown in FIG. 4.

Referring now to the drawings, FIG. 1 shows a clamping circuit 20 as known from the prior art comprising a capacitor 22, a diode 24 and a resistor 26. The output side of the clamping circuit 20 is connected to the input of an amplifier 28.

In FIG. 2 two pulses are illustrated. The pulse 31 is applied to the input of the capacitor 22 and the pulse 33 represents the pulse 31 as it emerges on the output side of the capacitor 22. It is noted that this pulse 33 has a dotted portion 35, which would exist if the diode 24 were absent. However, the diode 24 being an element of the circuit, catches, so to speak, the voltage as it tries to go negative and causes the capacitor 22 to be recharged to the level it had before the pulse began. This conduct will continue as long as there are somewhat ideal conditions, i.e., where the signal level is significantly higher than the noise level and diode drops.

FIG. 3 illustrates input and output pulses 37 and 39 where the noise is not small with respect to the signal. The input includes pulse wave 40 and noise wave 41 and 42, while the output 39 comprises pulse wave 44 and noise waves 45 and 46. As noted earlier, the problem arising under such conditions is that the noise waves will be rectified so that there is now a corrected base line 48 which is removed from the zero or ground level 49. It is on a raised level somewhat lower than that of the noise peak, which is undesirable as explained heretofore.

FIG. 4 illustrates the basic concept of the invention represented by a clamping circuit comprising the noted feedback feature. No diode is used herein and no recitfying action occurs. The circuit includes a differential amplifier 50 having two input lines 52 and 54, an RC-filter 56, 58 connected to the input line 54, a gate or analog switch element 60 placed in the feedback line 62 of the amplifier 50, and a threshold circuit 64 having it input coupled through a line 66 to the output line 70 and its output connected by way of lead 68 to the gate element 60.

In this circuit the amplifier input voltage $e_i$ which includes a d.c. level, is applied to the input 52 of the amplifier 50. No undershoot will occur, since there is no coupling capacitor to discharge during a pulse. The feedback arrangement has the task, as indicated earlier, of eliminating the d.c. level. At the output 70 of the amplifier 50 the voltage is fed back, passing RC-filter 56,58 and is applied to the input 54 of the differential amplifier 50. The differential amplifier 50 responds only to the voltage between inputs 52 and 54; this effectively subtracts the voltage at input 54 from that at input 52. The analog switch element 60 is controlled by the threshold circuit 64, as next set forth.

The threshold circuit 64 is arranged to put out a square pulse, if the output at 70 of amplifier 50 exceeds the noise level. This will occur if a signal pulse from the analysing apparatus arrives at the input 52 of amplifier 50. Such square pulse is applied to gate element 60 which, thereupon opens up the feed back path for the duration of the signal pulse. During the time period the switch 60 is open, there is no way for the filter capacitor 58 to discharge, so the base line remains as it was in the absence of the signal pulse.

Figure 6:
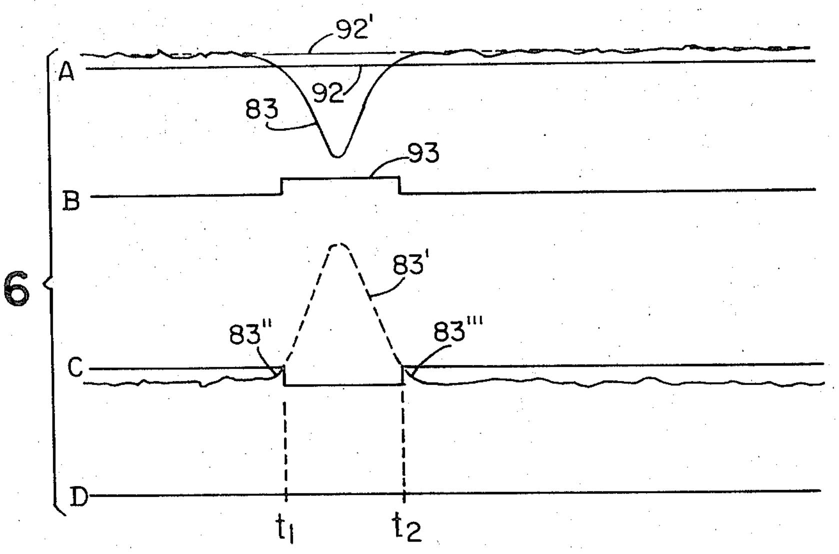
FIG. 6 illustrates wave forms processed by the circuit shown in FIG. 5.

FIG. 6 A–D illustrate pulse forms as applied to the circuit of this embodiment and derived therefrom. These waveforms apply to both FIGS. 4 and 5 and will be described in connection with the latter.

Examining the embodiment shown in the circuit of FIG. 5, a main differential amplifier 71 and a feedback path which includes an electronic switch 72, a resistor 73, a second amplifier 74 and a capacitor 75 are the equivalents of the amplifier 50, the gate 60, the resistor 56 and the capacitor 58 of the basic circuit of FIG. 4. The amplifier 74, the capacitor 75 and the resistance 73 together constitute an active integrator, for the attainment of longer time constants and larger voltage swings. It is shown as a differential amplifier which has one of its inputs, i.e. the non-inverting input grounded by path 91. The resistor 73 is connected by path 89 to the switch 72, by which means it receives its other input. An attenuator comprising resistors 76 and 77 is provided in the output connection 94 of the integrator in order to take advantage of the large voltage swings of the integrator with the attendant freedom from integrator drift. The attenuator 76 and 77 might be omitted for certain applications. The equivalent of the threshold circuit 64 of FIG. 4 comprises a comparator 81, and a reference voltage supply 78, which is attenuated and made adjustable by a potentiometer 79 connected to the comparator 81 via path 80. The other input to the comparator 81 is coupled to the output of the amplifier 71 via paths 67 and 52, the absolute value circuit 51, and path 53. If the voltage at the path 53 exceeds that at path 80, a signal will appear at path 87 to operate the switch 72.

The absolute value circuit 51 has an output at 53 of the same polarity regardless of the polarity of its input pulse at path 52, although the amplitude of the input signal is not altered. It permits the system to operate either with positive or negative pulses. For applications for which only unipolar pulses are being processed, the absolute value circuit 51 may be omitted, and the input connection 53 to the comparator 81 may be connected directly to the output of the amplifier 71 at path 67. It may also be omitted if there are no RC time constants previous to the input terminal 82 to create a flyback.

To follow the operation of the circuit, consider that the main amplifier 71 has a first input line 82 for receiving a signal 83 which is illustrated in FIG. 6A. The amplifier 71 is provided with a second input line 84. The amplifier 71 is constructed and arranged such that a signal entering through the first input 82 is inverted, while a signal entering at input 84 is not inverted. Accordingly, the main amplifier 71 inverts the signal 83, and has its gain stabilized by negative feedback resistor network comprising resistors 85 and 86.

An amplified replica of the signal 83 appears at output connection 67 of the main amplifier 71 and has the shape of the dotted curve 83′ in FIG. 6C. It is to be noted that FIG. 6C has been shown on a reduced vertical scale to enable accommodating larger values within the limits of the drawing.

The output of the amplifier 71 is rectified by the absolute value circuit 51 and applied to the voltage comparator 81 which, as noted above, acts as a threshold circuit and establishes a threshold level 92 as illustrated in FIG. 6A & C. When the rectified output level crosses the threshold 92, at $t_1$, as indicated in FIG. 6C, it causes the comparator 81 to produce an output. When the pulse subsides below the threshold level 92 at $t_2$, the output of the comparator 81 disappears, producing a pulse 93, as shown in FIG. 6B.

The electronic switch 72, having input leads 87 and 88, respectively connected to the outputs of comparator 81 and main amplifier 71 has an output 89 which is coupled to the amplifier 74. The switch 72 is normally closed, such that any voltage at lead 88 also appears at lead 89. The amplifier 74 is shown as a differential amplifier, wherein the non-inverting input at lead 91 is grounded. The value of this input connection will be explained later. The integrator formed as noted previously is ground referenced. When switch 72 is not operated, such that there is through connection from the lead 88 to the lead 89, the d.c. feedback path works to ensure that the d.c voltage level at 67 in the absence of signal pulses is accurately set at ground level.

The amplifier 74 has a second input lead 92 which is coupled via resistor 73 and the lead 89 to the switch 72. The output at the lead 94 of the amplifier 72 is equal to the gain of the amplifier multiplied by the input signal which is the difference between the inputs from leads 91 and 92. As those skilled in the art will recognize, this voltage at 94 becomes the integral of the voltage at the lead 89. Since the higher frequencies contained in the signal at path 89 are almost completely cancelled by the feedback action through the integrating feedback capacitor 75, this can be made to approach a pure d.c. voltage. Expressed otherwise, if the voltage at the output 88 of the amplifier 71 and hence at the lead 89 differs from the voltage appearing at the lead 91, which in this instance is ground potential, the difference is amplified and impressed upon the non-inverting input 84 of the main amplifier 71 which is in such a phase that it tends to reduce the difference. Because of the high gain of the amplifier 74, the voltage at 92 must be extremely close to ground reference, neglecting any offset at the input of the amplifier 74, which is designed to be small with respect to the signal at the output terminal 67. The feedback must be applied to the non-inverting input 84 of the main amplifier 71, because the feedback voltage suffers an inversion due to the amplifier 74. Those skilled in the art will recognize that other combinations of amplifier polarities may be made to perform in the same manner, and that in some applications, more or fewer amplifier stages may be used to achieve the same result. They will recognize that in the instant embodiment, all the parts in the feedback path such as lead 88, lead 89, resistor 73, lead 92, and lead 84 cooperate such as to maintain the d.c. level at the output 67 of the amplifier 71 at the voltage appearing at the input 91 of amplifier 74, in the absence of a signal.

When a signal pulse arrives at the input 82 of the main amplifier 71 such as 83 of FIG. 6A, the output at 67 of the amplifier 71 crosses the threshold level 92 which is set at two or three times the RMS value of the noise above the voltage level at the lead 91, which is here shown to be at ground potential, and produces the square pulse 93 as shown in FIG. 6B as described earlier.

Figure 7:
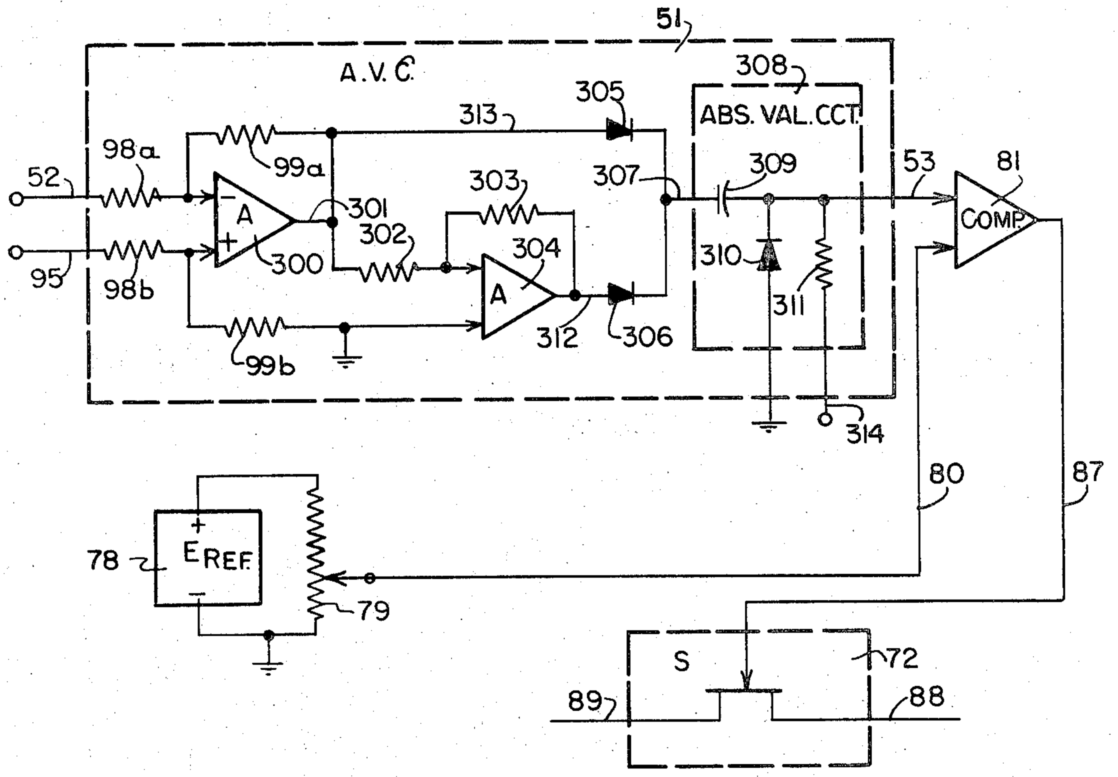
FIG. 7 illustrates in detail the ABSOLUTE VALUE CIRCUIT shown as a block in FIG. 5.

The square pulse 93 is applied by way of the lead 87 to the switch 72 and interrupts the feedback path for the duration of the signal pulse. Therefore, the only portion of the pulse which is included in the feedback d.c. voltage is the part made up of the small curved portions, so called "skirts" and designated 83″ and 83‴ in FIG. 6C. The capacitor 75, the amplifier 74 and the resistor 73 act in concert to filter out all the small waves and apply the d.c. and very low frequency components of the remaining signal back to the input 84 of the amplifier 71. With the exception of the skirts 83″ and 83‴, everything is the same as it was in the absence of a signal and except for the fact that the d.c. feedback factor is reduced by the duty cycle of the pulse 93. But the gain around the loop is so high that the change in the amount of the feedback is of no consequence. FIG. 7 shows in greater detail an absolute value circuit which may be used as the block 51 of the FIG. 5. The numbers designating leads and components of this circuit are the same as for the homologous parts appearing in FIG. 5. Thus the two inputs are 52 and 95. The input 95 is necessary in case it is desired that the baseline at the output 67 be somewhere other than at ground potential, as will be described hereinafter. To follow the operation, the connection 95 being rounded as shown in FIG. 5, the output signal from the main amplifier 71 is applied to the absolute value circuit 51 via path 62. The resistors 98 and 99 are for the purpose of providing negative feedback for stabilizing the gain of the amplifier 300. For many applications, the gain of the composite amplifier, including the feedback resistors, may be small, perhaps as little as one. Like the other amplifiers, it is direct coupled in order that there be no low frequency phase shifts and in order to preserve the d.c. levels of the signals involved. The difference between the voltages at 52 and 95 appear amplified at connection 301 at the output of the amplifier 0.

This is applied directly to the diode 305 and indirectly via the phase inverter comprising the amplifier 304 and the resistors 302 and 303 to the diode 306. This essentially provides a full wave rectifier such that the voltage at the connection 307 is positive regardless of the polarity of the difference between the voltages on paths 52 and 95. In the absence of pulse signals, the noise only will appear on the path 307 full wave rectified, but as explained before, everything is adjusted such that this produces no output from the threshold circuit to follow. However, either positive or negative pulses on path 67 at the final output appear as positive at path 307. These are applied to the comparator 81 via an anti-lockout circuit 308 comprising a coupling capacitor 309, a clamping diode 310, and a biasing resistor 311. The biasing resistor 311 is returned by means of path 314 to a source of negative voltage in order to cause a small bias current to flow in the diode 310 to ensure stability and to prevent noise from triggering the comparator 81 in the absence of pulse signals. Whenever a signal pulse due to a particle appears, at 82, regardless of its polarity it will produce a positive pulse at 307. This positive polarity pulse is compared by the comparator 81 with the voltage at the slider of the threshold level adjustment 79, as explained previously. When the signal plus noise exceeds the threshold level, the comparator 81 impresses a pulse on 87 opening up the switch 72 as explained heretofore.

The anti-lockout circuit 308 is a precautionary measure to ensure that the complete system of FIG. 5 will never get in a state from which it cannot recover. This state can be understood by considering that if the voltage at 67, when the equipment is turned on, for instance, exceeds the threshold level established by reference voltage 78 and adjustment potentiometer 79, the comparator 81 will have an output at 87 which will turn off the switch 72. Under these conditions, there will be no feedback, and there will be no way in which the d.c. at 67 can find an equilibrium at the desired, in this case, ground level. With the anti-lockout circuit 308 of FIG. 7, the d.c. component of the output signal is blocked by the capacitor 309; therefore if this situation obtains, the erroneous voltage will appear temporarily at connection 307, but the charge on the capacitor 309 will eventually be dissipated, and so the voltage at 53 will subside to a level which once again causes the comparator 81 to turn the switch back on. When the switch 72 is thus closed, the d.c. feedback loop through paths 88, 89, the amplifier 74 and the input to the amplifier 71 at 84 will be completed, and the system will seek equilibrium. The time constant of the capacitor 309 and the resistance 311 which desirably be returned to a negative voltage to provide small quiescent bias current in the diode 310 would be shorter than the effective time constant of the integrator as determined by the capacitor 75 and the resistor 73, such that the slow rate of the integrator through path 84 would not be fast enough to cause the voltage at 53 to exceed that at 79, so that the comparator 81 would turn off the switch 72. This is to say that the slow rate of change of the voltage at the connection 307 in volts per second would not exceed the bias current flowing in resistor 311 divided by the capacitance 309, or more understandably stated, the current which is the capacitance times the time rate of change of voltage would not exceed the bias current, which is the voltage drop in the resistance 311 divided by its resistance.

Figure 8:
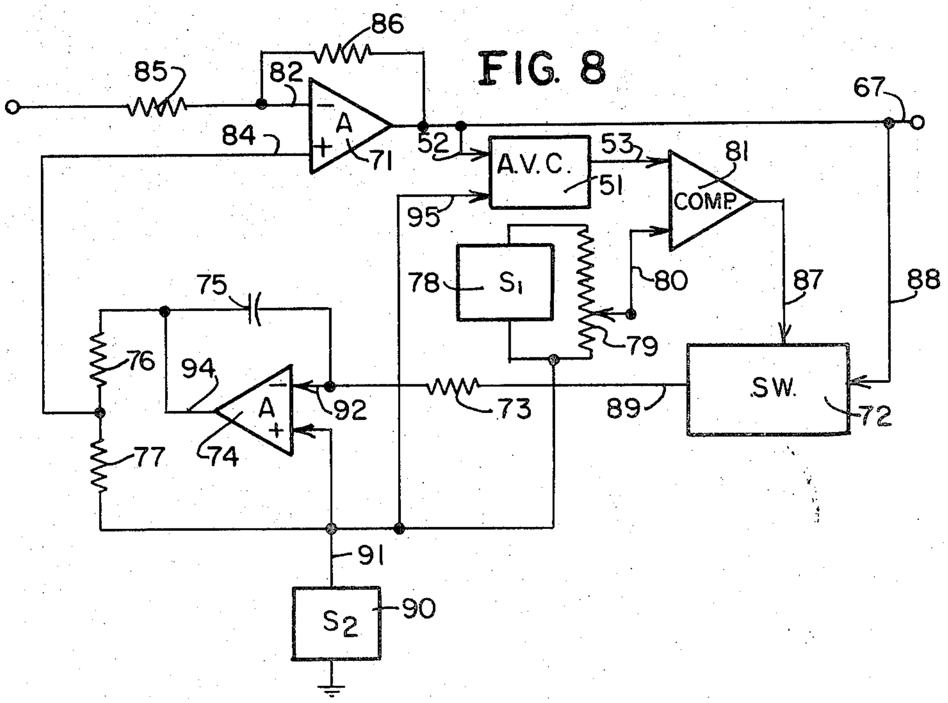
FIG. 8 shows an embodiment similar to that of FIG. 5, but including an additional voltage supply.

An alternative way of obviating this problem would be to connect a resistance 315 as shown in FIG. 5 in parallel with the electronic switch such that the d.c. feedback path would not be completely interrupted when the electronic switch 72 is turned off. This latter method causes the system to be somewhat less perfect, however, and would not be the preferable method.

for some applications, it will be found desirable to have the baseline fixed at some voltage level other than ground. For instance in U.S. Pat. application Ser. No. 196,094 (Klein, Channelyzer Expansion Dials) it is necessary to have the baseline adjustable to any legel at the command of the operator. In this case, it is necessary to return the reference input path 91 of the integrating amplifier 74 to some desirable voltage than zero. This is illustrated in FIG. 8, in which a second reference voltage supply 90 is added. It can be seen that not only the reference input to the integrating amplifier 74, but also the reference input 95 to the absolute value circuit is also returned to the reference voltage supply 90. If the anti-lockout circuit is used, it may be referenced to ground as shown in FIG. 7. However, if it is found that is not necessary to have the anti-lockout circuit, the connection 316 would be removed from ground and would also go to the supply 90, as shown in FIG. 8. In this case, the connections 316 and 91 would be connected together. By so connecting the circuit, the baseline is caused to seek equilibrium with the baseline at the voltage of the reference supply 90 and the circuit is in equilibrium when the voltage at 92 and hence that at 67 is equal to the voltage at 91.

Figure 9:
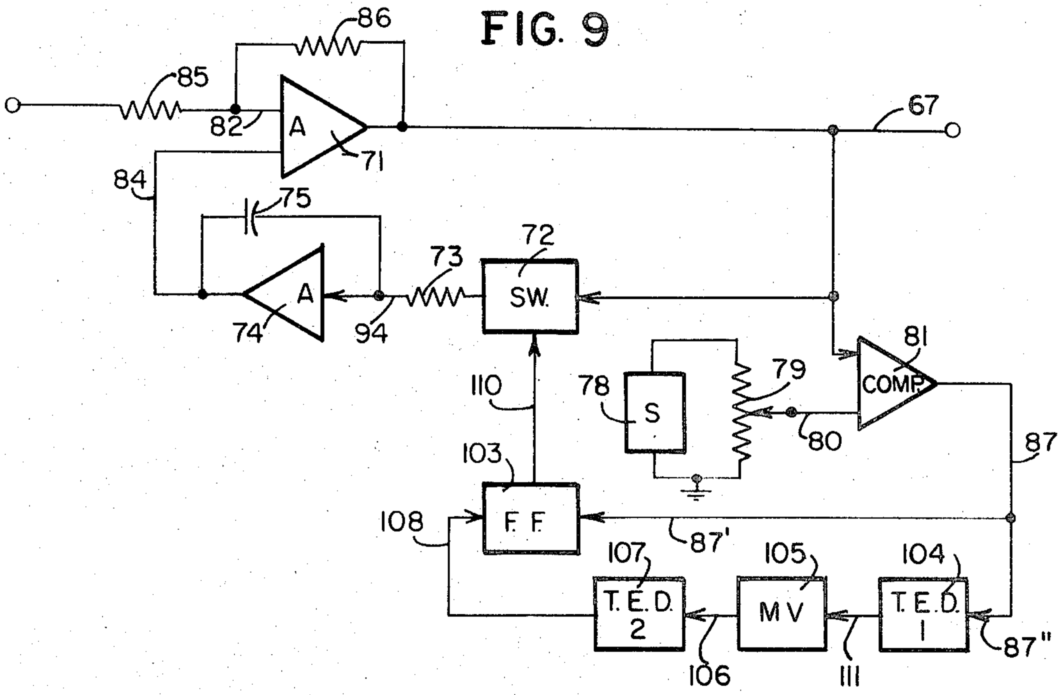
FIG. 9 shows another embodiment of the invention wherein a skirt of the wave form is eliminated.
Figure 10:
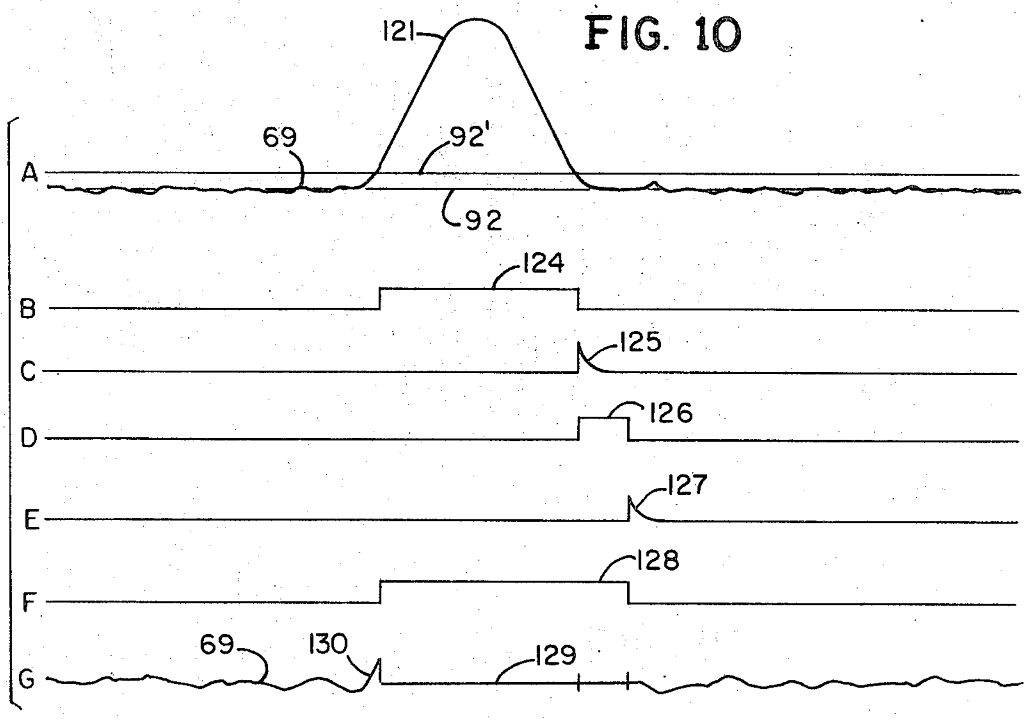
FIG. 10 illustrates wave forms processed by the circuit of FIG. 9.

FIGS. 9 and 10 illustrate another embodiment of the invention in which means are provided to eliminate the skirt 83''' at the trailing edge as shown in FIG. 6C. The general layout of the circuit of FIG. 9 is similar to that of FIG. 5, and, accordingly, the same reference numerals are used for the same components. The two circuits differ however in some aspects as next will be explained.

The electronic switch 72 is now operated by an R-S flip-flop 103 which is connected by two parallel paths 87' and 87'' to the output path 87 of the comparator 81. The first path 87' is a direct line between the comparator output and a first input of the flip-flop switch which is the input path for setting the flip-flop switch. The second path 87'' leads from the comparator output over a first trailing edge detector 104, a one-shot-multivibrator 105, a second trailing edge detector 107 to a second input 108 of the flip-flop 103. This is the input path for resetting the flip-flop switch.

The flip-flop 103 has its output lead 110 connected to the electronic switch 72.

In FIG. 10A a pulse 121 is shown as it appears at the output connection 67 of amplifier 71 in FIG. 9. This pulse 121 is applied to the comparator 81 which performs the same function as that in FIG. 5 and emits pulse 124 at 87, as shown in FIG. 10B whenever the pulse 121 exceeds the threshold level 92', as seen in FIG. 10A, established by voltage supply 78 and potentiometer 79. At the leading edge of pulse 124, as seen in FIG. 10B the flip-flop switch is set via direct path 87 such that the electronic switch 72 is opened. When the output pulse 121 receeds below the threshold level 92', the trailing edge of the pulse 124 is sensed by the first trailing edge detector 104 which comprises a small capacitor and a diode, to produce a trigger pulse 125 on path 111 as seen in FIG. 10C. This triggers the one-shot-multivibrator 105 to generate a pulse 126, as shown in FIG. 10D, which pulse is set for the longest probable duration of the skirt at the trailing edge of the signal pulse. The pulse 126 reaches via the path 106, the second trailing edge detector 107 which, at the end of pulse 126, generates the trigger pulse 127 as shown at E of FIG. 10D. The trigger pulse 127 is supplied by the path 108 to the flip-flop switch 103 and used to reset the flip-flop 103, which, accordingly, turns the electronic switch 72 back on, reconnecting the d.c. feedback loop.

In the alternative, a pulse 128, as shown in FIG. 10F which is applied to the electronic switch 72 via path 110 could be formed by using an "OR" arrangement of the two pulses 124 and 126, such that the switch 72 would be opened if there were either an output on path 87 or path 106. This would eliminate the second trailing edge detector 107 and the flip-flop 103, but would necessitate concern that the changeover did not leave a gap where netiher pulse 124 nor pulse 126 was holding the switch open. However, with sufficiently fast circuits, this would present little problem.

Figures 11, 14:
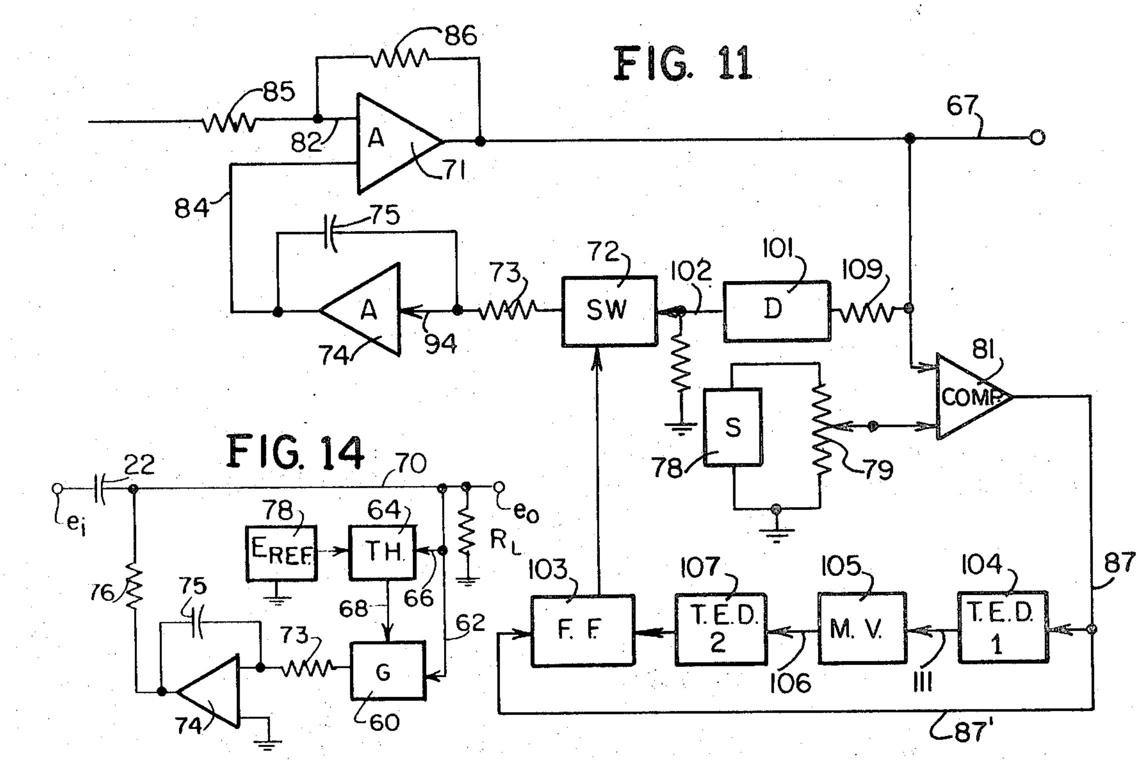
FIG. 11 illustrates a further embodiment of the invention for eliminating skirts on both sides of the wave.
FIG. 14 illustrates in block form an embodiment of the invention in which there is no amplification between the input and output terminals.
Figure 12:
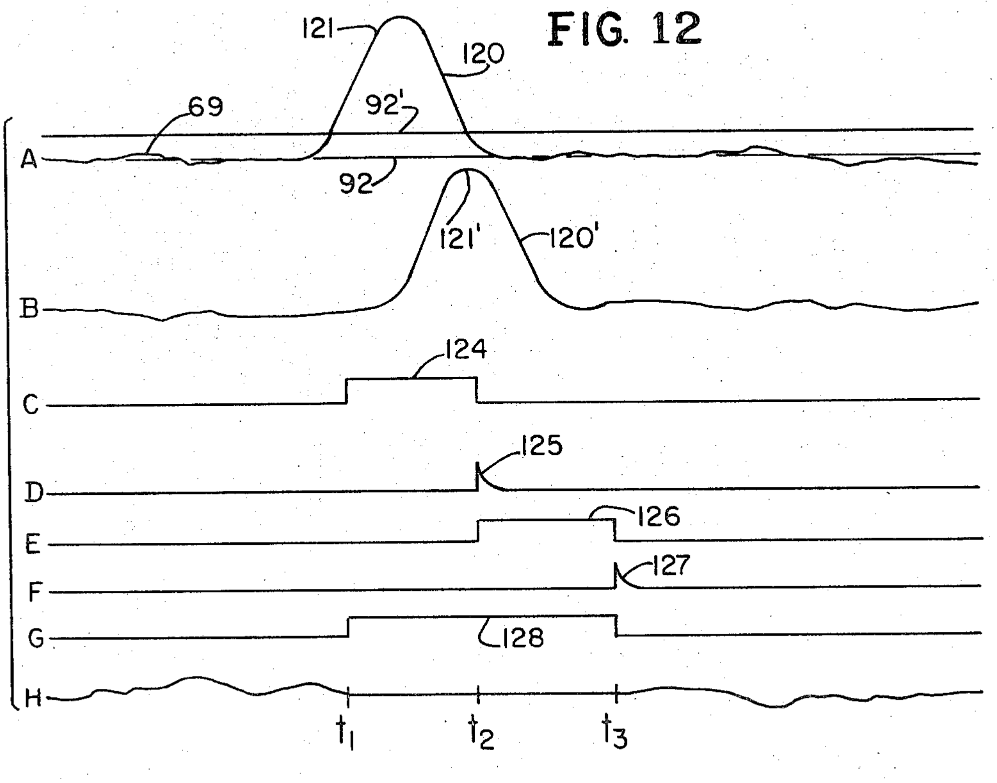
FIG. 12 shows a wave form processed by the circuit of FIG. 11.

FIGS. 11 and 12 show another embodiment of the invention wherein the skirts on both sides of the pulse are prevented from influencing the d.c. level. This is obtained by providing a delay means between the output 67 and switch 72 including a delay line 101 preceded by a resistor 109.

The general character of the circuit of FIG. 11 is similar to FIG. 9 and hence, the same reference numerals are used for the same components. The difference between the two circuits is the delay line in the d.c. feedback path of FIG. 11.

Considering the function of the delay line it is obvious that any signal that goes into delay element 101 comes out undistorted at 102 at some later time depending upon the constants of the delay line. This includes both signal and d.c. level. It is certainly meaningless to delay d.c., but everything that goes in comes out. This provides the advantage of foreseeing events and permits to react to what is going to happen at 102 before it happens.

In operation, a pulse 121 at output 67 of amplifier 71 is applied to comparator 81 which emits a pulse 124 at 87 whenever pulse 121 exceeds the threshold level established by the voltage of 78 and 79. At the leading edge of this pulse 124 as seen in FIG. 12C the flip-flop 103 is set via path 87 such that the electronic switch 72 is opened. This occurs before the skirt of the pulse 120', as shown in FIG. 12B begins to emerge from the delay element and hence, there is no inaccuracy due to this minor effect. The trailing edge of the pulse is eliminated by the same means, i.e., the trailing edge detectors and one-shot-multivibrator as earlier described for the circuit in FIG. 9.

It is to be noted that the pulse 126 generated by the one-shot-multivibrator, as seen in FIG. 12E is set for a duration of the sum of the delay of the delay element plus the longest probable duration of the signal pulse skirt.

Also, the "OR" device noted earlier for FIG. 9 may be used for the circuit of FIG. 11.

The result is that the waveform of the voltage at input connection 94 to the integrator 73, 74, 75 of FIG. 11 contains nothing but the noise, the signal having been chopped out with sufficient space before and after the signals to insure that the d.c. content of the signal pulse train has no influence on the operating point. As explained previously, this ensures that the base line is in the center of the noise as desired.

Figure 13:
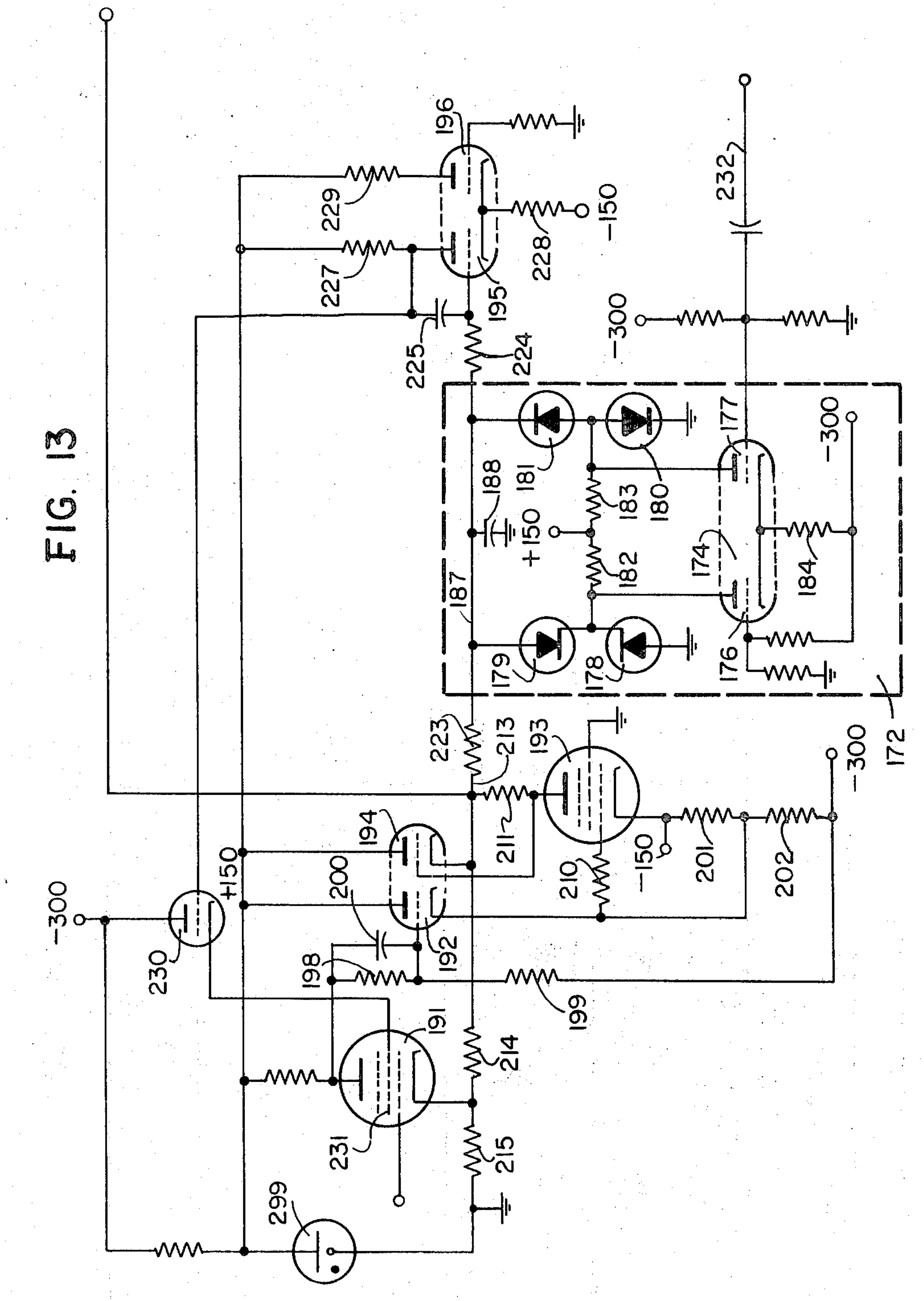
FIG. 13 shows a partial circuit diagram of an embodiment of the invention including circuit elements, particularly of an electronic switch of shunt type design.

FIG. 13 shows a partial circuit diagram of a clamp which has been constructed in accordance with the principles of the invention as outlined earlier.

In correlating the circuit diagram of FIG. 13 with the basic circuit of FIG. 4, it will be noted that the gate or analog switch 60 of FIG. 4 is the equivalent of an electronic switch or an assembly of elements 172 comprising components such as diodes, triodes, and resistors arranged as next described. A dual triode 174 comprises triodes 176 and 177, wherein the triode 177 is normally conducting, and the grid thereof is coupled via line 232 to a threshold circuit, not shown, which is set just above the noise level. Two pairs of diodes 178, 179 and 180, 181 are arranged such that the cathodes of diodes 178, 179 are commonly coupled over a resistor 182 to a voltage supply of plus 150 volts, and are also connected to the plate of triode 176. The plates of diodes 180, 181 are commonly coupled over resistor 183 to a plus 150 volts supply, and are also connected to the plate of the triode 177. The cathodes of triodes 176, 177 are commonly coupled over resistor 184 to a potential of −300 volts.

Switching transients appearing on lead 187 connecting the plate of diode 179 with the cathode of diode 181 are by-passed by means of a 100 micro-microfarad capacitor 188. Lead 187 is also coupled to the pentodes 191, 193 and the triode 194, as shown on the left side of the drawing, and to the grid of the triode 195 by way of large resistor 224.

The tubes 191 and 193 which are of the 6136 type provide the gain. A voltage regulator tube 299 regulates and smoothes the supply voltage to the plates of the tubes 191, 192, 194, 195, and 196. The triode 192 is a cathode follower which d.c. couples the first stage 191 to the second stage 193 by the voltage divider 198 and 199. A capacitor 200 shunting 198 is small and serves to prevent loss of high frequencies. The resistors 201 and 202 are the cathode resistor for the cathode follower 192; their Thevenin equivalent is a resistor going to minus 159 volts and having a resistance of 47K ohms.

A 10K ohms resistor 210 interposed between the cathode of triode 192 and the first grid of pentode 193 is a parastic supressor. The triode 194 and the resistor 211 constitute a dynamic load resistor for the pentode 193. The output of the entire amplifier is the connection 213 extending to the lead 187 in the gate means or switch 172. The Broad-band negative feedback for signal gain stability is made up of the resistors 214 and 215.

In the normal condition, no signal being present, the triode 176 is cut off and the triode 177 is saturated, the diodes 178 and 179 are back biased by having their cathodes highly positive and the diodes 180 and 181 are back biased by having their anodes highly negative. Therefore there is no d.c. path to ground from connection 187, and the d.c. component of the signal at 213 proceeds without attenuation through the 270K resistor 223 and the 3.3 Megohm resistor 224. The triode 195, acting in concert with its plate resistor 227 and cathode resistance comprising triode 196 and its cathode and plate resistors 228 and 229, forms a Miller integrator because of the large capacitor 225 connected between its grid and its plate. The symmetrical connection of triodes 195 and 196 minimize drift due to cathode temperature variations and contact potential. Thus the d.c. component only undergoes even more amplification.

The d.c. component of the signal, thus amplified, is fed back to the screen grid 231 of the input tube 191 via the cathode follower 230, the grid of which is wired directly to the plate of the d.c. amplifier 195. This insures that the d.c. level at connection 213 is very close to ground. The accuracy with which this takes place is determined principally by the stability of the dual triode 195–196. This can be expected to hold within a very small fraction of a volt in such a symmetrical circuit with such a low operating current.

The output voltage at connection 213 undergoes similar amplification or is applied to one or more threshold circuits. As noted earlier, there is a threshold which is set just above the noise level and which has an output if any size of particle goes through the aperture. As soon as a signal voltage rises above this threshold, a large rectangular pulse is impressed upon the connection 232 in the lower right hand corner of the drawing which cuts off the triode 177, and since this is coupled through the common cathode resistor 184 to the triode 176, saturates 176 instead.

As a result of this switching action, the anode of 176 swings negative until diode 178 conducts and the anode of 177 swings positive until the diode 180 conducts. Both anodes will now be very near ground potential. This will cause diode 179 and 181 to conduct as well, and the signal at connection 187 is thus effectively short-circuited to ground. Therefore, the d.c. component of the pulse is prevented from being included in the input to the low frequency amplifier 195.

Thus the feedback path is interrupted during signal pulses and the d.c. component of the pulses is not fed back. However in the absence of pulse signals, the feedback maintains the base line very close to ground as desired. The very long time constant of the Miller integrator 224, 195, 225, 227 etc. prevents the base line from changing during a pulse.

Although the refinements of the analog signal delay means 101 of FIG. 11, the absolute value circuit, the anti-lockout feature and the adjustable baseline level features of FIG. 7 etc. are not included in all embodiments illustrated, it is obvious that any of these features may be included in any of the embodiment depending upon circumstances and requirements.

FIG. 14 is a circuit which clamps the voltage at the output terminal 70 to, in this case, ground potential, but does not have any gain; its sole function is to position the baseline of the output pulse chain at ground potential.

The circuit, being an analogous structure to the previously described circuits, has an input terminal $e_i$ and an output terminal $e_o$, which are connected by a line 70. A capacitor 22 is arranged adjacent to the input terminal $e_i$ on line 70. Intermediate the output side of capacitor 22 and the output terminal $e_o$ a feedback path is provided which includes a line 62 leading to a gate G or 60, an amplifier 74 coupled to the gate 60 via a resistor 73, and a resistor 76 in a line connecting the output of the amplifier 74 with the output side of capacitor 22. A capacitor 75 bridges the input and output sides of amplifier 74. A threshold element TH or 64 is arranged in parallel to gate 60 and is connected to line 62 by means of input 66. The connection between threshold 64 and is made over line 68. A reference voltage source $E_{REF}$ or 78 which is grounded supplies the reference voltage to the threshold 64. A load resistor $R_L$ is shown connected to the output terminal $e_o$ of the circuit.

The operation is as before. The input signal applied to the input terminal is applied via capacitor 22 to the output terminal at path 70. When the signal voltage exceeds the reference voltage produced by the reference voltage source 78, the threshold circuit 64 produces an output pulse at path 68, which opens the gate 60 and prevents the output voltage from being fed back via the integrator 73, 74, 75 and the resistor 76. The resistor 76 and the coupling capacitor 22 provide further filtering; in the absence of a pulse signal, the threshold 64 is not exceeded and the output voltage, which is the baseline voltage, is applied through gate 60 to the integrator 73, 74, 75, and the integral of this voltage appears at the output of the integrator and causes a current to flow in resistor 76 which charges or discharges the capacitor 22 until the voltage at the output terminal is zero. When there is a train of positive pulses appearing at the input and, hence, at the output, the area of the signal below the baseline, which was normally equal to the area above the baseline in order that the DC component be zero, is integrated by the integrator 73, 74, 75 to produce a current in the resistor 76 which will change the charge in the capacitor 22, thus reducing this erroneous baseline offset voltage by a factor equal to the gain of the operational amplifier 74 multiplied by the duty cycle of the pulse chain appearing on the path 68. Since this duty cycle is seldom more than ten or fifteen percent, and since the operational amplifier normally has a gain in the order of 50,000 to 100,000, this results for all practical purposes in perfect positioning of the baseline at the path 70. The resulting d.c. current flowing through the resistor 76 and hence in the load resistor $R_L$ thus produces a d.c. voltage drop substantially equal to the voltage by which the baseline would otherwise be depressed.

It is believed that the foregoing adequately will enable those skilled in the art to appreciate and practice this invention and, if necessary, make modifications which will fall within the scope of the invention as defined by the accompanying claims.

What is sought to be protected by the United States Letters Patent is:

1. A method of clamping a train of electric pulses having a first d.c. level and waves superimposed thereon for positioning the base line thereof at a desirable second d.c. level, said method comprising the steps of:

a. applying the first d.c. level of the pulse train to a clamping stage having input and output sides, b. d.c. coupling the clamping stage such that the d.c. level of the pulses appearing at the output of the clamping stage is a function of the d.c. levels at its input, c. filtering the d.c. level from said output and feeding a d.c. level proportional thereto back to the input of the clamping stage, d. combining the fed-back d.c. level with the first d.c. level and signal, e. interrupting the feedback path if said output differs from said desirable d.c. level by a predetermined value, and f. restoring the feedback path if the magnitude of the difference between said output and said desirable level falls below said predetermined value.

2. The method as set forth in claim 1, and comprising the step of amplifying the train of electric pulses having the first d.c. level and waves superimposed thereon.

3. Apparatus for clamping electric pulses having input and output terminals for receiving an input signal comprising a train of pulses superimposed upon a first d.c. level and producing a composite signal comprising a train of pulses proportional to those of the input signal and superimposed upon a second d.c. level, said apparatus including:

a. means for establishing a desird d.c. level,
b. means for comparing said output signal with said desired d.c. level,
c. means for combining said input signal with a feedback signal,
d. filter means for feeding back a result of comparison of said desired level and said output signal including said second d.c. level to a terminal of said combining means,
e. means for modifying the feedback means at least during those periods in time in which the difference between said output signal and said desired level exceeds a predetermined amount, to form said feedback signal, and
f. means for holding said feedback signal substantially constant during the time that the feedback path is modified, whereby said second level and said desired level approach equality regardless of number and size of said train of pulses in said input signal.

4. Apparatus as claimed in claim 3, and further including a d.c. coupled amplifier.

5. Apparatus as set forth in claim 4, wherein the amplifier includes a first input lead, a second input lead, and an output lead, and the feedback means include a feedback path coupling the output lead of the amplifier with the second input lead, said modifying means comprising gate means, and threshold circuit means, the inputs of the last two means being coupled to the amplifier output, and the output of the threshold circuit means being coupled to the gate means for controlling the gate means.

6. Apparatus as set forth in claim 4, wherein the filter means includes a low pass filter comprising a first capacitor and a first resistor, the first terminals of the first capacitor and first resistor being connected to the second input lead of the amplifier, the second terminal of the first capacitor being grounded, and the second terminal of the first resistor being connected to the output lead of the gate means.

7. Apparatus as set forth in claim 6, and further comprising:

a. a stabilizing feedback resistor network including a second resistor in the first input lead of the amplifier and a third resistor in a path bridging the first input with the output of the amplifier,
b. an integrator having an input lead connected to the gate means, and an output lead connected to the second input lead of the amplifier,
c. the threshold circuit means including a comparator having a first input lead, a second input lead and an output lead, the output lead being connected to the gate means,
d. absolute value circuit means having a first input lead connected to the output of the amplifier, a second input lead connected to ground, and an output lead connected to the first input lead of the comparator, and
e. first voltage supply means comprising an electric source and voltage divider arranged parallel thereto, and grounded, the slider thereof being connected to the second input of the comparator.

8. Apparatus as set forth in claim 7, wherein the gate means is shunted by a resistor.

9. Apparatus as set forth in claim 7 including second voltage suuply means connected to the integrator and the first voltage supply means.

10. Apparatus as set forth in claim 7 wherein the amplifier is a first amplifier, and the integrator comprises:

a. a second amplifier having a first input lead coupled to the gate means, a second input lead connected to ground, an output lead coupled to the second input lead of the first amplifier,
b. a second capacitor in a path connecting the output of the second amplifier with the first input thereof,
c. a resistor in a path connecting the first input of the second amplifier with the gate means, and
d. an attenuator comprising a pair of resistors in series connection, the seventh resistor being grounded, the node between the last two resistors being connected to the second input of the first amplifier.

11. Apparatus as set forth in claim 10, wherein the absolute value circuit means comprise A. a third amplifier having
  a. a first input lead coupled to the output lead of the first amplifier,
  b. a second input lead being grounded,
  c. an output lead,
  d. a resistor in the first input lead, and
  e. a resistor in a path connecting the first input lead and the output lead, the absolute value circuit means further comprising
B. a fourth amplifier, including
  a. a first input lead coupled to the output lead of the third amplifier,
  b. a second input lead connected to the second input lead of the third amplifier,
  c. an output lead coupled to the comparator,
  d. a resistor in the first input lead, and
  e. a resistor in a path bridging the first input lead and the output lead,
C. a first diode in the output path of the third amplifier,
D. a second diode in the output path of the fourth amplifier, the cathodes of the two diodes being commonly coupled to the comparator,
E. an anti-lockout circuit interposed between the two diodes and the comparator.

12. Apparatus as set forth in claim 11, wherein the anti-lockout circuit comprises a. a third capacitor in the first input lead of the comparator, and
b. a third diode and a resistor being arranged in parallel to the first input lead of the comparator.

13. Apparatus as set forth in claim 10, and further comprising:

a. a first trailing edge detector having the input thereof connected to the output of the comparator, and b. a one-shot-multivibrator, the input thereof connected to output of the trailing edge detector, the output of the one-shot-multivibrator connected to the gate means.

14. Apparatus as set forth in claim 13, and further comprising:

a. a flip-flop switch operatively connected to the gate means, the flip-flop switch having a first input line, a second input line and an output line, the first input line of the flip-flop switch being directly connected to the output of the comparator for setting the flip-flop switch, the second input line of the flip-flop switch being electrically parallel to the first input line and coupled to the output of the comparator for resetting the flip-flop switch, the output lead of the flip-flop switch being directly connected to an input of the gate element, and b. a second trailing edge detector, the input thereof connected to the output of the one-shot-multivibrator, the output of the second trailing edge detector being connected to the second input of the flip-flop switch.

15. Apparatus as set forth in claim 14, and further comprising:

a. a delay member one terminal thereof coupled to the output of the first amplifier and the other terminal connected to the gate means, b. another resistor interposed between the delay member and the output of the first amplifier, and c. a further resistor, one terminal thereof connected to the path connecting the delay member with the gate means, the other terminal thereof being grounded.

16. Apparatus as set forth in claim 4, comprising:

a. a first pentode, the first grid thereof connected to the signal input lead, b. a pair of resistors coupled to the cathode of the first pentode for providing negative feedback signal gain stability, c. a second pentode, d. means for coupling the second pentode to the first pentode including means for coupling the cathode of the second pentode to the plate of the first pentode, e. a first triode being a cathode follower coupled to the first pentode, f. a voltage divider d.c. coupling the first triode to the first pentode, g. a pair of resistors arranged in series as cathode resistor of the cathode follower and being connected on one side to a potential of −150 volts and on the other to a potential of −300 volts h. a resistor in the order of 10K ohms interposed as a parasite suppressor between the first grid of the second pentode and the cathode of the cathode follower, i. a second triode having a resistor in series with the cathode thereof, being arranged as dynamic load resistor for the second pentode, j. an output lead of the second pentode having a branching off terminal being coupled to the gate means, and k. a Miller integrator coupled to the gate means.

17. Apparatus as set forth in claim 16, wherein the gate means comprise:

a. a fourth diode and a fifth diode arranged such that the cathodes thereof are connected in common to a voltage supply in the order of +150 volts, the plate of the fourth diode being coupled to said output voltage lead of the second pentode, the plate of the second diode being grounded, b. a sixth diode and a seventh diode arranged such that the plates thereof are connected in common to a voltage supply in the order of +150 volts, the cathode of the sixth diode being coupled to said output voltage lead of the second pentode, the cathode of the seventh diode being grounded, c. a first dual triode including a third triode and a fourth triode, the plate of the third triode being connected to the juncture of the cathodes of the fourth and fifth diodes, the plate of the fourth triode being connected to the juncture of plates of the sixth and seventh diodes, the cathodes of the third and fourth triodes being commonly coupled over a resistor to a voltage supply in the order of −300 volts, the grid of the third triode being coupled to ground over a resistor and also coupled through another resistor to a −300 volt potential, the grid of the fourth triode being coupled to a threshold circuit which is set just above noise level negative pulses, and d. a capacitor, one terminal thereof of being grounded, the other terminal thereof being connected to said output voltage lead of the second pentode at a point intermediate the juncture connections to the plate of the fifth diode and the cathode of the seventh diode.

18. Apparatus as set forth in claim 16, wherein the Miller integrator comprises:

a. a fifth triode and a sixth triode, the cathodes of the fifth and sixth triodes being commonly coupled over a resistor in the order of 270K ohms to a voltage supply of about −150 volts, the grid of the fifth triode being coupled over a resistor in the order of 3.3 Megohm to said output voltage lead of the second pentode, the grid of the sixth triode being coupled over a resistor to ground, the plate of the fifth triode being shunted to the grid thereof by a capacitor in the order of 1.0 microfarad, the plates of the fifth and sixth triodes being coupled over resistors in the order of 470K ohms each to a path joining the plates of the first and second triodes as well as the plate of the first pentode, and b. means for coupling the plate of the fifth triode to the first pentode.

19. Apparatus as set forth in claim 18, wherein the means for coupling the plate of the fifth triode to the first pentode includes a seventh triode, the cathode thereof being connected to the second grid of the first pentode, the grid of the seventh triode being connected to the plate of the fifth triode, and the plate of the seventh triode being connected to a −300 volt potential, and coupled to the plate of the first pentode, there also being provided a voltage regulator tube coupled to the cathode of the first pentode and the plate thereof.

20. Apparatus as set forth in claim 16, wherein the means for coupling the cathode of the second pentode to the plate of the first pentode includes a resistor in the order of 50K ohms and a resistor in the order of 680K ohms, the last two resistors being connected in series the node therebetween being connected to the cathode of the first triode.

* * * * *